Figure 1:
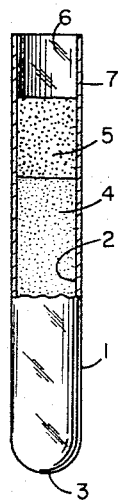

Aug. 29, 1967 J. H. SCHULMAN 3,337,948
METHOD OF MANUFACTURE OF MINIATURE RADIATION DOSIMETERS
Filed June 25, 1964 2 Sheets-Sheet 1

INVENTOR
JAMES H. SCHULMAN
BY
ATTORNEYS

Aug. 29, 1967  J. H. SCHULMAN  3,337,948
METHOD OF MANUFACTURE OF MINIATURE RADIATION DOSIMETERS
Filed June 25, 1964  2 Sheets-Sheet 2
FIG. 5
FIG. 6
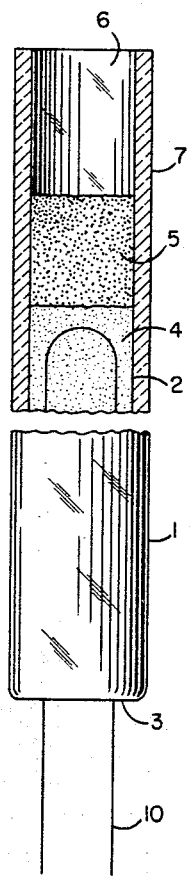
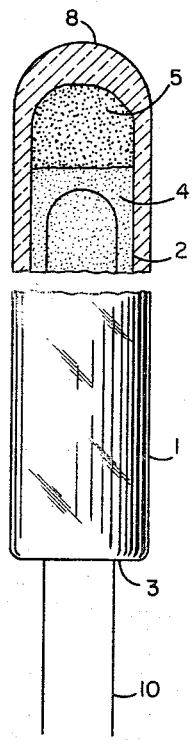
INVENTOR
*JAMES H. SCHULMAN*
BY
ATTORNEYS

# United States Patent Office 3,337,948
Patented Aug. 29, 1967

3,337,948
METHOD OF MANUFACTURE OF MINIATURE
RADIATION DOSIMETERS
James H. Schulman, Forest Heights, Md.
(6469 Livingston Road, Oxon Hill, Md. 20021)
Filed June 25, 1964, Ser. No. 378,083
4 Claims. (Cl. 29—592)

The invention described herein may be manufactured and used by or for the Government of the United States of America for governmental purposes without the payment of any royalties thereon or therefor.

This invention relates to a method of sealing thermoluminescent powder in fine diameter glass tubes, more particularly for the manufacture of miniature radiation dosimeters.

Thermoluminescent material when exposed to ionizing radiation such as X-rays and gamma rays stores energy in the form of trapped electrons. Subsequent heating of the radiation exposed material releases these electrons from their traps to produce a luminescent glow. The number of electrons trapped in the exposed material is proportional to the intensity of the ionizing radiation and hence the intensity of the luminescent glow can be used to determine the strength of received radiation. The height of the glow peak, as observed with a photomultiplier tube, can be used as the measure of the radiation dose.

It is known that mechanical disturbance of the grains of a loosely packed body of thermoluminescent powder can result in the production of a supurious thermoluminescence which may be confused with thermoluminescence from small radiation doses in the milliroentgen range.

A miniature radiation dosimeter has been heretofore designed in which a body of thermoluminescent powder in closely packed condition is sealed in a glass tube of fine diameter so as to be immobile in the tube whereby to minimize mechanical disturbance of the powder grains in the normal handling of the dosimeter. This dosimeter is made by a method in which the thermoluminescent powder is filled into the fine diameter glass tube which is sealed at one end to form a closely packed body of the thermoluminescent powder in the tube, the tube and powder degassed under high vacuum and then sealed off under a continued negative pressure in the tube by fusion of the glass of the tube above and near the powder level therein until the resulting inflow of molten glass completely fills the space in the tube above the closely packed powder and immobilizes the latter in the tube.

In the sealing of thermoluminescent powder in a glass tube by the above prior art method it is inevitable that some of the powder close to the seal will become heated during fusion of the glass of the tube. In some instances particles of the powder may react with the glass to prevent sealing or form a weak seal. Where the fine diameter glass tube dosimeter is to contain a coaxial metal filament for electrical heating of the radiation exposed thermoluminescent powder, the problem is greater since it is not possible with fine diameter tubes to clean away powder clinging to the portion of the metal filament which is to be embedded in the glass of the seal in the closing of the filled tube.

It is an object of the present invention to provide a method of sealing a body of thermoluminescent powder in fine diameter glass tubes for the manufacture of miniature radiation dosimeters in which overheating and reaction of particles of the body of the thermoluminescent powder with the glass of the seal is avoided and any adverse effect on the seal from overheating and fusion of particles of the powder which are present on the metal filament is offset.

The above and other objects are accomplished by the practice of the method of my invention which comprises modifying the aforesaid prior art method of fabricating miniature sealed glass tube radiation dosimeters to provide a closely packed layer of glass powder of a composition compatible in coefficient of expansion and fusion point range with the glass of the tube in packed contact with and between the closely packed body of thermoluminescent powder and the zone of sealing of the tube and, after degassing of the tube and closely packed powder under high vacuum, sealing off the tube and closely packed powder under a continued negative pressure in the tube by fusion of the glass of the tube at and directly above the upper surface of the glass powder layer.

In the sealing off operation, the upper surface of the glass powder layer is fused but the lower section of this layer remains unchanged to serve as thermal insulation which protects the body of the thermoluminescent powder against overheating and reaction with molten glass at the seal. The molten glass from the fusion of the tube by virtue of the negative pressure in the tube flows inwardly to merge with the molten glass of the upper surface of the glass powder layer to form the seal which in the solidified state immobilizes the closely packed powder layers in the completed dosimeter.

For a more complete understanding of the method of my invention reference is had to the following description and to the accompanying drawings which illustrate in exaggerated dimensions several forms of miniature dosimeters whch may be made by the method.

Figure 2:
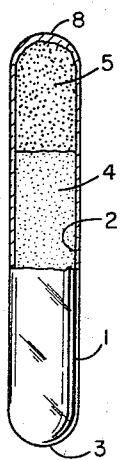
Figure 3:
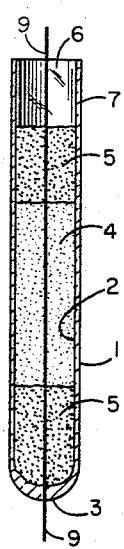
Figure 4:
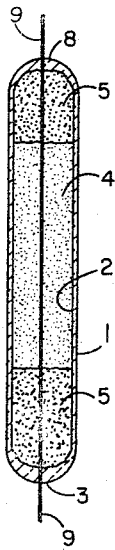

In the drawings like numerals indicate like parts and:

FIG. 1 is a view partly in section of a fine diameter glass tube containing superposed closely packed layers of glass powder and thermoluminescent powder in an initial stage of the method of the invention, FIG. 2 is a view partly in section of the glass tube and contained powder layers of FIG. 1 after the tube has been sealed following the method of the invention to form the completed dosimeter, FIG. 3 is a view in section of a fine diameter glass tube containing a coaxial metal heating filament extending through superposed closely packed layers of glass powder and thermoluminescent powder in an initial stage of the method of the invention, FIG. 4 is a view in section of the glass tube and contained metal filament and powder layers of FIG. 3 after the tube has been sealed following the method of the invention to form the completed dosimeter, FIG. 5 is a view partly in section of a fine diameter glass tube containing a modified form of metal heating filament and superposed closely packed layers of glass powder and thermoluminescent powder in an initial stage of the method of the invention, and FIG. 6 is a view partly in section of the glass tube and contained metal filament and powder layers of FIG. 5 after the tube has been sealed following the method of the invention to form the completed dosimeter.
method of the invention to form the completed dosimeter.

Referring to the drawing, FIG. 1 shows a fine diameter glass tube 1 which may be made of borosilicate glass (Pyrex) having an outer diameter of 1 mm. and an inner diameter 2 of 0.75 mm. and which has been fusion sealed at the bottom end 3. The tube arranged in vertical position is partly filled with thermoluminescent powder which is well tamped in the tube to form a closely packed body or layer 4 of the powder which fills the lower end of the tube. The powder may be filled into the tube in increments with tamping of each increment. Powdered borosilicate glass (Pyrex) or other powdered glass of a composition compatible in coefficient of expansion and fusion point range with the glass of the tube is filled into the tube and well tamped to form a closely packed layer 5 of the powdered glass in contact with the closely packed layer 4 of the thermoluminescent powder. The thickness of the glass powder layer 5 is so chosen as to prevent contact and consequent reaction between molten glass from the fusion operation and the thermoluminescent powder layer 4. A suitable thickness of the glass powder layer 5 for this purpose is from about 2 to 4 mm. The particle or grain size for the glass powder and the thermoluminescent powder suitably is in the range of from about 1 to 500 microns. The upper portion 6 of the glass tube is left unpacked for the purpose of sealing off the tube after the degassing operation.

Degassing of the tube 1 and contained powder layers 4 and 5 is conducted with the tube arranged in the vertical position. The degassing can be carried out in conventional manner by heating the tube and contained powder layers in an electric furnace to a temperature of 300 to 400° C. and pumping down the heated tube to a high vacuum, eg., $10^{-3}$ to $10^{-6}$ mm. Hg. The vacuum pump is connected to the glass tube 1 by means of a length of glass tubing which is fused to the tube at the open end. This auxiliary tubing is subsequently disconnected by the sealing off operation. After the degassing has been completed and before sealing off the tube, the high vacuum in the tube 1 may be partly replaced and in known way with a filling of an inert gas of high thermal conductivity, such as argon, to assist transfer of heat to the thermoluminescent powder when the exposed dosimeter is subsequently heated to produce the luminescent glow.

Sealing of the degassed tube and contained closely packed powder layers 4 and 5 is conducted under the negative pressure prevailing in the tube which may be the high vacuum of the degassing operation or a reduced vacuum resulting from the introduction of a partial fill of the inert gas into the degassed tube. The tube is sealed off in a zone which is at and directly above the upper surface of the glass powder layer 5. This zone is indicated generally at 7. The sealing off may be effected by heating the glass of the tube and the upper surface of the glass powder layer 5 by means of the tip of a gas flame. The molten glass of the tube is drawn into the tube by the effect of the negative pressure in the tube and merges with the molten glass of the upper surface of the glass powder layer to form the seal 8 which in the solidified state immobilizes the closely packed powder layers 4 and 5 in the glass tube of the completed miniature dosimeter as shown in FIG. 2. The lower section of the glass powder layer 5 remains unchanged to protect the thermoluminescent powder 4 from being overheated and reacting with the glass of the seal during the fusion operation. This unchanged glass powder is inert and does not hinder the function of the miniature dosimeter.

FIG. 3 depicts the miniature dosimeter of FIG. 4 in an intermediate stage of the fabrication. This dosimeter is similar to that shown in FIG. 2 but is designed to be heated internally by means of a coaxial electric heating filament 9 having its terminals for electrical connection extending in sealed relationship through the glass seals 3 and 8. This form of the miniature dosimeter is fabricated in the manner as described above for the making of the dosimeter shown in FIGS. 1 and 2 with the additional operation of first axially aligning the filament 9 in the tube 1 and with the filament extending through one end of the tube sealing the filament in known way through the bottom end 3 before filling the closely packed layers of thermoluminescent powder and glass powder into the tube 1. As shown, a closely packed layer 5 of glass powder is filled into the tube above and below the thermoluminescent powder layer 4 for purposes of symmetry. However, the tube may be filled with the two layer powder arrangement as shown in the dosimeter of FIG. 2. The filament 9 is a fine wire of from about 3 to 5 mils in diameter, suitably of tungsten, molybdenum or platinum, and during the sealing off operation on the tube 1 is sealed in axial alignment through the glass seal 8 to extend beyond the end of the tube. Particles of the thermoluminescent powder which may be present on that portion of the filament 9 which extends through the zone of sealing of the tube will be heated to react with the molten glass from the fusion, but the amount of the molten glass present about this portion of the filament will be more than sufficient to offset any adverse effect of reacted particles and to produce a sound glass seal 8 containing filament 9 extending therethrough.

A miniature radiation dosimeter having a modified design of internal electrical heating filament is shown in an intermediate stage of fabrication in FIG. 5 and in the complete form in FIG. 6. This dosimeter is provided with a return-bend electrical heating filament 10 which is wholly lodged in the thermoluminescent powder layer 4. It is fabricated in the manner described above for the making of the dosimeter of FIGS. 1 and 2 with the additional operation of first, by means of a suitable jig, aligning the filament 10 with both terminals extending through the one end of the glass tube 1 and enclosing the terminals in the glass seal 3 as shown, before filling the closely packed thermoluminescent powder layer 4 into the tube about the return-bend filament 10 and the closely packed glass powder layer 5 above and in contact with the thermoluminescent powder layer 4. Sealing off of the degassed tube and powder layers under a negative pressure in the tube to form the glass seal 8 and the completed dosimeter as shown in FIG. 6 is conducted by the method as described above for the making of the miniature radiation dosimeters of FIGS. 1 to 4.

A preferred thermoluminescent material for use as the radiation detector in miniature radiation dosimeters made by the method of the invention is the phosphor, manganese activated calcium fluoride, $caF_2$:Mn, developed by Ginther and Kirk, NRL Progress Report for September 1956; J. Electrochemical Soc. 104, 365 (1957). This phosphor is characterized by having a dominant glow peak at about 250° C. which singular property is believed to be due to the presence of a small amount of oxide-oxygen in the crystal lattice of the calcium fluoride. It has sufficient sensitivity for low dose applications and has deep stable electron traps. Another but less preferred thermoluminescent material for the miniature dosimeters is powdered lithium fluoride.

The magnitude of the cross-section of the thermoluminescent powder in the miniature radiation dosimeter is important to the rapid transfer of heat through the powder for the readout-heating of the exposed dosimeter. For dosimeters which are to be heated externally, the inner diameter of the tube should not exceed about 1 mm. and for those which contain an internal heating filament, the inner diameter of the tube should not exceed about 2 mm. in order to obtain a good signal-to-background ratio during the process of measuring the luminescent glow from the heated irradiated phosphor powder. The dosimeter may contain varying amounts of the thermoluminescent powder depending upon the length and inner diameter of the dosimeter. Miniature dosimeters as described herein and which measure from about 6 to 8 mm. in length are of a geometry suitable for implanting in the human body for in vivo measurement of radiation dosage received by the system in radiation therapy with X-rays or gamma rays. Dosimeters of a length of the order of 6 to 8 mm. would preferably contain about 8 to 20 milligrams of the phosphor powder.

Since the invention may be variously embodied without departing from the spirit or scope thereof, it is intended that the foregoing description shall be taken by way of illustration and not in limitation except as may be required by the appended claims.

What is claimed is:

1. A method of manufacturing a miniature radiation dosimeter in which a closely packed body of thermoluminescent powder is immobilized in a sealed glass tube which comprises filling the lower portion of a fine diameter glass tube which is sealed at one end and open at the other with an arrangement of closely packed and contiguously layered thermoluminescent powder and glass powder in which a layer of glass powder of a composition compatible with the glass of the tube in coefficient of expansion and fusion point range is superposed on the thermoluminescent powder, degassing the tube and closely packed powder layers under high vacuum and sealing off the degassed tube and closely packed powder layers under a continued negative pressure in the tube by fusion of the glass of the tube at and directly above the upper surface of said superposed glass powder layer, said superposed glass powder layer being of a depth sufficient to protect the layered thermoluminescent powder from contact and reaction with fused glass during the sealing off of the glass tube.

2. A method of manufacturing a miniature radiation dosimeter as defined in claim 1, wherein the arrangement of closely packed and contiguously layered powder in the fine diameter glass tube consists of a lower layer of the thermoluminescent powder and an upper layer of glass powder of a composition compatible in coefficient of expansion and fusion point range with the glass of the tube and of a depth sufficient to protect the thermoluminescent powder layer from contact and reaction with fused glass during the sealing off of the glass tube.

3. A method of manufacturing a miniature radiation dosimeter as defined in claim 2, wherein the glass powder has the same composition as the glass of the tube.

4. A method of manufacturing a miniature radiation dosimeter in which a closely packed body of thermoluminescent powder surrounds a coaxial electrical heating filament and is immobilized in a sealed glass tube which comprises filling the lower portion of a fine diameter glass tube which is sealed at one end and open at the other and in which is assembled a coaxial electrical heating filament which extends in sealed relationship through the sealed end of the tube with an arrangement of closely packed and contiguously layered thermoluminescent powder and glass powder in which a layer of glass powder of a composition compatible with the glass of the tube in coefficient of expansion and fusion point range is superposed on the thermoluminescent powder, degassing the tube and closely packed powder layers under high vacuum and sealing off the degassed tube and closely packed powder layers under a continued negative pressure in the the tube by fusion of the glass of the tube about the upper portion of the coaxial filament at and directly above the upper surface of said superposed glass powder layer, said superposed glass powder layer being of a depth sufficient to protect the layered thermoluminescent powder from contact and reaction with fused glass during the sealing off of the glass tube.

References Cited

UNITED STATES PATENTS

| | | | |
|---|---|---|---|
| 1,410,741 | 3/1922 | Erdle | 350—71 X |
| 2,028,241 | 1/1936 | Paul | 250—71 X |
| 2,093,491 | 9/1937 | Shermund | 65—59 X |
| 2,480,903 | 9/1949 | Charbonneau | 65—59 X |
| 3,115,578 | 12/1963 | Schulman | 250—71 |
| 3,141,973 | 7/1964 | Heins et al. | 250—71 |

JOHN F. CAMPBELL, *Primary Examiner.*

CHARLES T. MOON, *Examiner.*

J. M. ROMANCHIK, J. L. CLINE, *Assistant Examiners.*